United States Patent [19]

Duggar, Jr.

[11] 3,735,957
[45] May 29, 1973

[54] VALVE
[76] Inventor: Anderson Duggar, Jr., 4350 Delmere, Royal Oak, Mich. 48073
[22] Filed: Oct. 14, 1971
[21] Appl. No.: 189,460

[52] U.S. Cl. ................... 251/330, 251/164, 251/312
[51] Int. Cl. .............................................. F16k 25/00
[58] Field of Search ...................... 251/330, 164, 312

[56] References Cited

UNITED STATES PATENTS 688,298   12/1901   Foss .................................... 251/164

FOREIGN PATENTS OR APPLICATIONS 339,542   4/1936   Italy ................................... 251/330

Primary Examiner—Harold W. Weakley
Attorney—Cullen, Settle, Sloman and Cantor

[57] ABSTRACT

A valve suitable for high pressure applications comprises a plug with a transverse bore which is rotatable through ninety degrees to bring the bore either into or out of registry with the conduit bore for the respective on and off positions. The plug has conically tapering portions which converge toward each end to cooperate with complimentary tapered bores in the valve housing to provide seals in the respective open and closed positions as the plug moves axially slightly during its rotation between such positions. Tightening of the valve cap on the valve housing threads is achieved by a screw which passes through the cap tangentially to and in engagement with spline-like teeth on the housing, rotation of the seated screw causing rotation of the cap on the housing.

1 Claim, 2 Drawing Figures

Patented May 29, 1973

3,735,957

INVENTOR.
ANDERSON DUGGAR, JR.
BY
CULLEN, SETTLE, SLOMAN & CANTOR.
ATT'YS.

VALVE

BACKGROUND AND SUMMARY OF INVENTION

One objective of this invention is to provide a valve capable of controlling high pressure fluid flow, and which has a minimum of friction and wear so as to reduce the maintenance required for replacement of seals.

Another object of this invention is to provide an improved means for securing the valve cap to the housing, which avoids the use of a wrench for application or removal, thereby permitting replacement of the valve in confined spaces.

According to the invention, the primary sealing function is provided by engagement of cooperating conically tapering surfaces on the valve plug and housing or cap. The plug rotates on a threaded stud as it turns through 90° between its open and closed positions. The slight axial movement which accompanies this rotation causes the plug to shift from sealing engagement on one conical surface in one position to a similar engagement along the other oppositely tapered surface in the other position. A conventional O-ring or similar type seal is required, if at all, only in the intermediate or partially open position. Thus, there is essentially no friction or wear requiring frequent maintenance or replacement of the seal.

The cap is secured by threads to the housing extension, and a novel means for tightening or loosening these threads comprises a bolt which engages spline-like teeth on the extension much in the manner of a worm and ring gear. Rotation of the seated bolt causes the cap which carries the bolt to revolve around the toothed housing extension.

DETAILED DESCRIPTION OF THE INVENTION

Figure 1:
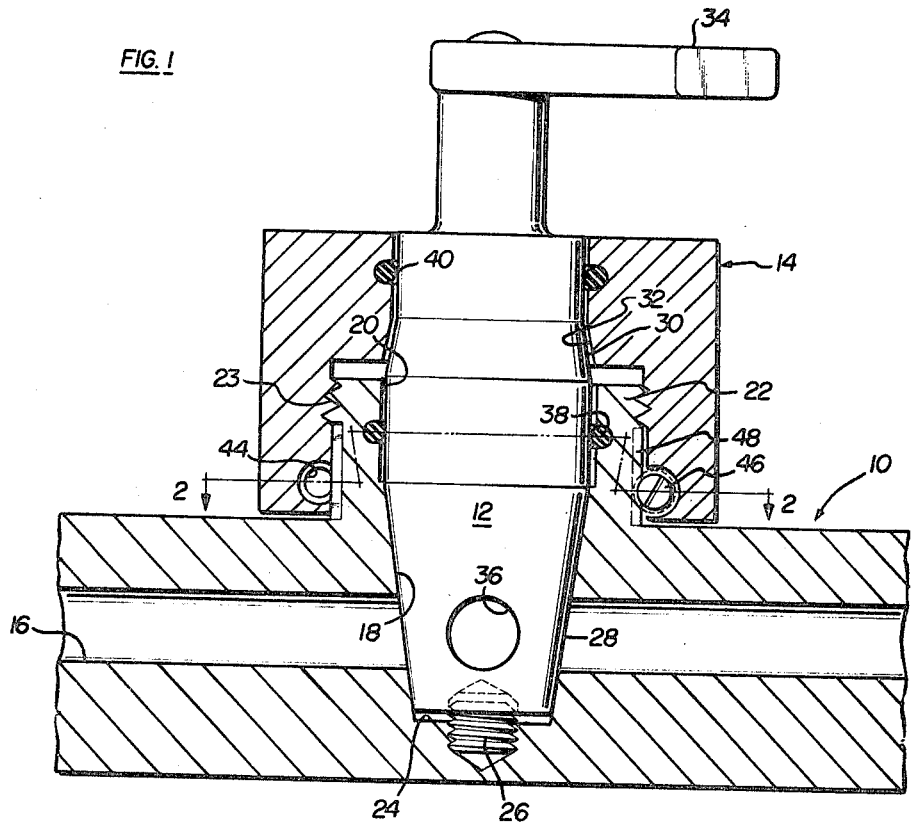
FIG. 1 is a cross-sectional elevation through the improved valve of this invention.

Referring to FIG. 1 of the drawings, the invention generally comprises a housing 10, a valve plug 12 and a threaded cap 14. Housing 10, which is generally T-shaped, is provided with a longitudinal bore 16 intended to be connected by appropriate threaded sections to a conduit which is to be controlled by the valve. Housing 10 is further provided with a transverse tapered plug-receiving bore 18 which extends upwardly into a bore 20 of housing extension 22. The upper outer portion of extension 22 is provided with a threaded portion 23 onto which cap 14 is threaded.

The lower end of tapered bore 18 is formed as a seat 24, into which a threaded stud 26 is inserted. The upper end of stud 26 is received in the lower end of plug 12, so that rotation of plug 12 in housing 10 causes the plug to advance or withdraw axially along the threads of stud 26.

It will be seen that plug 12 has first and second oppositely tapered ends 28 and 30. Tapered surface 28 matches tapered bore 18 of housing 10 while tapered surface 30 matches tapered bore 32 in cap 14. Plug 12 may be rotated by a handle 34 secured to its upper end in any conventional fashion. Plug 12 is further provided with a bore 36, which, in the position shown, is transverse to bore 16 of housing 10 to establish a closed position of the valve. When plug 12 is rotated 90°, bore 36 will be axially aligned and in communication with bore 16 of housing 10 to establish a fully opened condition.

An O-ring type seal 38 provides a fluid-tight seal between the untapered central portion of plug 12 and the bore 20 of housing extension 22. If necessary, an optional additional seal 40 can be provided between plug 12 and cap 14.

In the closed condition illustrated in FIG. 1, the sealing function is performed by the engagement of tapered surface 28 of plug 12 against tapered bore 18 of housing 10. Similarly, in the open condition of the valve, when plug 12 has withdrawn upwardly along threaded stud 26, the reverse taper 30 will seal against tapered bore 32 of cap 14. Friction and wear occurs only in the last few degrees of rotation of plug 12, when the cooperating conical surfaces come into contact. There is no metal-to-metal contact during substantially all of the movement between the two extreme positions.

Seal 38 is required, if at all, only in the partially open condition of the valve, when the conical surfaces are out of contact. It is possible that secondary seals 38 and 40 may be completely unnecessary, or at most only of low pressure type, if the clearance or gap between the conical surfaces is small enough. For example, with a ¼—20 thread on stud 26 and an 8 degree slope on the conical surfaces, a one-eighth revolution of plug 12 to the position midway between full open and full closed would produce only about a 0.001 inch gap between the opposed conical surfaces. A shallower taper or finer thread would reduce the gap further. Hence, if any secondary seal were necessary at all, it could be of a simple low pressure type.

Elimination of rubber type secondary seals would eliminate this source of contamination where food or nuclear products are involved.

A novel means of tightening or loosening cap 14 onto the threaded portion 23 of housing extension 22 is also disclosed. Instead of providing the outer circumference of cap 14 with hexagonal flats, as is conventional, cap 14 is provided with a pair of clearance holes 42, 44, shown in both FIGS. 1 and 2. An Allen head bolt 46 is inserted into one or the other of these two holes, with the teeth of bolt 46 engaging matched spline-like threads 48 on housing extension 22.

Figure 2:
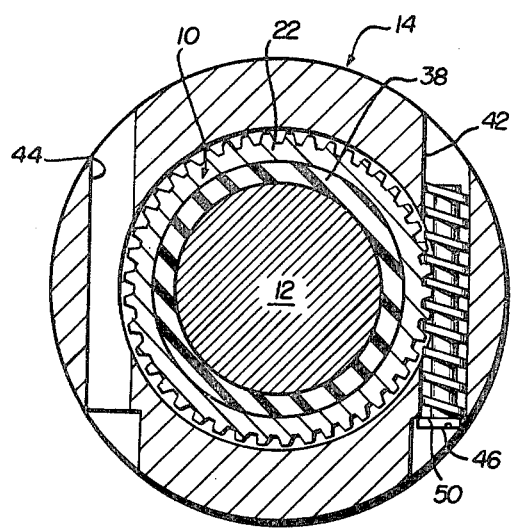
FIG. 2 is a plan view in cross-section taken in the direction of arrows 2—2 of FIG. 1.

Thus, in the condition shown in FIGS. 1 and 2, bolt 46 is advanced along threads 48 until the head of the bolt engages shoulder 50 of the cap. At that time, further rotation of the bolt will cause the bolt and cap within which it is mounted to walk around the teeth of housing extension 22 in a clockwise direction as viewed in FIG. 2. If it desired to rotate the cap in the opposite direction, bolt 46 is withdrawn from hole 42 and inserted in hole 44, with the opposite effect.

As an alternative to the two hole system, a single hole, such as hole 42, could be used with a bolt having heads at both ends, with the length of the bolt between the undersides of the heads at opposite ends being slightly longer than the distance between the two shoulders of the hole. With such an arrangement, rotation of the bolt in one direction would seat one head, while rotation in the other direction would seat the opposite end. Thus, it would not be necessary to move the screw from one hole to another to tighten or loosen the cap.

The valve closing concept disclosed herein permits a two-piece valve to be employed, if desired, by omitting the cap 14. A stop would be provided on housing extension 22 to engage a projection or plug 12 to prevent the thread from disengaging in the open position.

The novel tightening system disclosed above may be particularly advantageous in cramped quarters where there may not be sufficient room to swing a wrench, as would be normally required to turn a cap provided with conventional hexagonal flats.

This invention may be further developed within the scope of the following claims. Accordingly, the above specification is to be interpreted as illustrative of only a single operative embodiment of this invention, rather than in a strictly limited sense.

I now claim:

1. A valve comprising:
   a generally T-shaped housing having a first bore extending longitudinally along the head of the T and further having a second bore extending along the stem of the T and communicating with said first bore;
   said first bore being adapted to conduct fluid therethrough when the valve is open, and said second bore containing a valve plug movable rotatably and axially therein and projecting at all times completely across said first bore and into the head portion of the housing wall lying directly opposite to the stem of the T;
   the outer circumference of said T stem being threaded to receive an internally threaded portion of a cap, said cap being provided with an axial bore to receive said valve plug;
   said valve plug having first and second ends, said first end being connected by threaded means to said head portion of the housing wall lying directly opposite to the stem of the T, so that the rotation of said plug in a first direction advances said stem along said threaded means and rotation of said plug in the opposite direction withdraws said stem along said threaded means;
   said valve plug having a first smooth conically tapering surface which converges towards said first end and which is received in a complimentary tapering portion of said second bore on both sides of said first bore;
   said second end of said valve plug having a second smooth conically tapering surface which converges towards said second end and which is received in a complimentary tapering portion of said cap bore;
   said valve plug being further provided with a bore transverse to the longitudinal axis of said plug and positioned adjacent its first end and at a point whereby rotation of said valve plug in a first direction along said threaded means brings said valve plug bore into coaxial alignment with said housing first bore to open the valve to fluid flow, and rotation of said valve plug through about 90° in the opposite direction closes the valve to fluid flow;
   said valve providing a fluid-tight seal in the full open and full closed positions solely by the engagement of one of the tapered surfaces of said valve plug with its complimentary tapered surface on said housing or said cap.

* * * * *